(12) United States Patent
Ye

(10) Patent No.: US 10,324,340 B2
(45) Date of Patent: Jun. 18, 2019

(54) PIXEL ELECTRODE

(71) Applicant: Shenzhen China Star Optoelectronics Technology Co., Ltd., Shenzhen (CN)

(72) Inventor: Yanxi Ye, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 199 days.

(21) Appl. No.: 15/326,649

(22) PCT Filed: Dec. 15, 2016

(86) PCT No.: PCT/CN2016/110074
§ 371 (c)(1),
(2) Date: Jan. 17, 2017

(87) PCT Pub. No.: WO2018/036028
PCT Pub. Date: Mar. 1, 2018

(65) Prior Publication Data
US 2018/0335675 A1    Nov. 22, 2018

(30) Foreign Application Priority Data
Aug. 26, 2016   (CN) .......................... 2016 1 0740946

(51) Int. Cl.
*G02F 1/1337*   (2006.01)
*G02F 1/1343*   (2006.01)

(52) U.S. Cl.
CPC ...... *G02F 1/134336* (2013.01); *G02F 1/1343* (2013.01); *G02F 1/13439* (2013.01);
(Continued)

(58) Field of Classification Search
CPC ................. G02F 1/1343; G02F 1/1337; G02F 1/134336; G02F 1/13439;
(Continued)

(56) References Cited

U.S. PATENT DOCUMENTS

| 7,663,719 B2 * | 2/2010 | Nakao ............... G02F 1/133784 349/123 |
| 2003/0071952 A1 * | 4/2003 | Yoshida ............ G02F 1/134363 349/141 |

(Continued)

FOREIGN PATENT DOCUMENTS

CN        102253542 A      11/2011

*Primary Examiner* — Charles S Chang
(74) *Attorney, Agent, or Firm* — Leong C. Lei

(57) ABSTRACT

The present invention provides a pixel electrode. The pixel electrode comprises a peripheral frame electrode that is in an enclosed form and at least one pair of peripheral edges of the peripheral frame electrode are provided, on outer sides thereof, with a sawtooth-like configuration. The sawtooth-like configuration comprises tooth troughs having an extension direction that is substantially parallel to and consistent with an extension direction of branch electrodes of the pixel electrode corresponding thereto so that liquid crystal in an area corresponding to the peripheral frame electrode may incline in the direction of the branch electrodes in the same way as liquid crystal in an inside area of the peripheral frame electrode inclines in such a direction to prevent the occurrence of dark patterns in the area corresponding to the peripheral frame electrode. Application of the pixel electrode to an HVA liquid crystal display panel would effectively improve transmission rate and brightness of the liquid crystal display panel so as to improve the display performance.

18 Claims, 3 Drawing Sheets

(52) U.S. Cl.
CPC ............... *G02F 1/1337* (2013.01); *G02F 2001/133742* (2013.01); *G02F 2201/122* (2013.01); *G02F 2201/123* (2013.01)

(58) Field of Classification Search
CPC ... G02F 2001/133742; G02F 2201/122; G02F 2201/123
USPC ..................................................... 349/139
See application file for complete search history.

(56) References Cited

U.S. PATENT DOCUMENTS

| | | | |
|---|---|---|---|
| 2005/0179846 A1* | 8/2005 | Lee | G02F 1/133512 349/141 |
| 2012/0190157 A1* | 7/2012 | Yoon | H01L 21/02422 438/158 |
| 2013/0128208 A1* | 5/2013 | Yao | G02F 1/134309 349/142 |
| 2017/0192260 A1* | 7/2017 | Tang | G02F 1/137 |
| 2017/0228063 A1* | 8/2017 | Wang | G06F 3/044 |

* cited by examiner

PIXEL ELECTRODE

BACKGROUND OF THE INVENTION

1. Field of the Invention

The present invention relates to the field of display technology, and more particular to a pixel electrode.

2. The Related Arts

Liquid crystal display (LCD) has various advantages, such as thin device body, low power consumption, and being free of radiation, and is widely used, such as liquid crystal televisions, mobile phones, personal digital assistants (PDAs), digital cameras, computer displays, or notebook computer screens, and takes a leading position in the field of flat panel displays.

Active thin-film transistor LCD (TFT-LCD) is the most commonly used liquid crystal displays in the mainstream market and can be classified, according to how liquid crystal is driven, as a twisted nematic (TN) or super twisted nematic (STN) mode, an in-plane switching (IPS) mode, and a vertical alignment (VA) mode, among which the VA mode liquid crystal display exhibits an extremely contrast as compared to liquid crystal displays of other modes, making it extremely widely used in large-sized displaying, such as televisions. A high vertical alignment (HVA) mode is an important branch of the VA mode.

A liquid crystal display generally comprises an enclosure, a liquid crystal panel arranged in the enclosure, and a backlight module arranged in the enclosure. The liquid crystal panel is structurally made up of a thin-film transistor (TFT) array substrate, a color filter (CF) substrate, and a liquid crystal layer arranged between the two substrates, wherein the operation principle is that a drive voltage is applied to a pixel electrode on the TFT substrate and a common electrode on the CF substrate to control rotation of liquid crystal molecules of the liquid crystal layer in order to refract out light emitting from the backlight module to generate an image.

An HVA mode liquid crystal display uses a layer of polymer that grows on an alignment film to make liquid crystal forming a predetermined pre-tilt angle so as to achieve an effect of surface control of rotation of the liquid crystal, thereby providing advantages of being of a lower cost and a high transmission rate as compared to other VA modes. In the HVA mode liquid crystal display, the pixel electrode may have two structures, one being open and the other closed. For a pixel electrode having an open structure, since peripheral edges of the electrode show no connection therebetween and since the non-closed structure provides a strong electric field, dark lines may occur between electrodes. This situation is easier to occur for smaller sizes of pixels. On the other hand, the closed structure of a pixel electrode, which is illustrated in FIG. 1, is such that one single pixel electrode is divided into four areas and specifically comprises: a cross-shaped keel 100, a rectangular peripheral frame 200, a plurality of first branch electrodes 301 in the form of strips, a plurality of second branch electrodes 302 in the form of strips, a plurality of third branch electrodes 303 in the form of strips, and a plurality of fourth branch electrodes 304 in the form of strips. The peripheral frame 200 circumferentially encloses the keel 100 to define four rectangular electrode areas, which are respectively first, second, third, and fourth electrode areas 401, 402, 403, 404. The plurality of first branch electrodes 301 are substantially parallel to and spaced from each other and are arranged in the first electrode area 401 and each of the first branch electrodes 301 is connected to both the keel 100 and the peripheral frame 200; the plurality of second branch electrodes 302 are substantially parallel to and spaced from each other and are arranged in the second electrode area 402 and each of the second branch electrodes 302 is connected to both the keel 100 and the peripheral frame 200; the plurality of third branch electrodes 303 are substantially parallel to and spaced from each other and are arranged in the third electrode area 403 and each of the third branch electrodes 301 is connected to both the keel 100 and the peripheral frame 200; and the plurality of fourth branch electrodes 304 are substantially parallel to and spaced from each other and are arranged in the fourth electrode area 404 and each of the fourth branch electrodes 304 is connected to both the keel 100 and the peripheral frame 200. The first branch electrodes 301, the second branch electrodes 302, the third branch electrodes 303, and the fourth branch electrodes 303 respectively incline with respect to a horizontal direction at angles of a degrees, (a+90) degrees, −a degrees, and −(a+90) degrees, where a is greater than 0 and smaller than 90. Since extension directions of the peripheral frame 200 are different from extension directions of the first branch electrodes 301, the second branch electrodes 302, the third branch electrodes 303, and the fourth branch electrodes 303, in an area corresponding to the peripheral frame 200, liquid crystal cannot tilt in a direction of the extension of the first branch electrodes 301, the second branch electrodes 302, the third branch electrodes 303, and the fourth branch electrodes 303 in the same way as that in the first, second, third, and fourth electrode areas 401, 402, 403, 404, so that dark patterns may easily occur in the area corresponding to the peripheral frame 200. The occurrence of the dark patterns directly affects the transmission rate of the pixel thereby affecting displaying brightness of a liquid crystal display panel.

SUMMARY OF THE INVENTION

An objective of the present invention is to provide a pixel electrode that helps reduce dark patterns occurring at an edge frame, increase transmission rate, and improve display performance of a liquid crystal display panel that involves the pixel electrode.

To achieve the above objective, the present invention provides a pixel electrode, which comprises: a rectangular peripheral frame electrode and a plurality of branch electrodes arranged in an interior space of the peripheral frame electrode and connected to the peripheral frame electrode;

the peripheral frame electrode comprising four electrode zones, which are respectively first, second, third, and fourth electrode zones, arranged in a two-by-two matrix in the interior thereof;

the plurality of branch electrodes comprising: a plurality of first branch electrodes arranged in the first electrode zone and substantially parallel to and spaced from each other, a plurality of second branch electrodes arranged in the second electrode zone and substantially parallel to and spaced from each other, a plurality of third branch electrodes arranged in the third electrode zone and substantially parallel to and spaced from each other, and a plurality of fourth branch electrodes arranged in the fourth electrode zone and substantially parallel to and spaced from each other, a being greater than 0 and smaller than 90;

the peripheral frame electrode having at least a pair of opposite peripheral edges each having an outer side comprising a sawtooth-like configuration, which comprises a plurality of tooth troughs spaced from each other, the tooth troughs each having two opposite side walls, the two side walls of the tooth trough being substantially parallel to a lengthwise direction of the branch electrodes in one of the electrode zones corresponding to the tooth trough, the tooth troughs having a depth that is smaller than a width of a peripheral edge of the peripheral frame electrode on which the tooth troughs are provided.

One pair of opposite peripheral edges of the peripheral frame electrode is provided, on outer sides thereof, with the sawtooth-like configuration.

Two pairs of opposite peripheral edges of the peripheral frame electrode are provided, on outer sides thereof, with the sawtooth-like configuration.

The tooth troughs correspond, in a one by one manner, to the branch electrodes that are connected to the peripheral edge on which the tooth troughs are provided and each of the tooth troughs has a central line substantially coincident with a central line of the branch electrode to which the tooth trough corresponds.

Each of the tooth troughs has a width that is substantially equal to a width of the branch electrode to which the tooth trough corresponds.

The tooth troughs respectively correspond to slits formed between the branch electrodes connected to the peripheral edge on which the tooth troughs are provided and each of the tooth troughs has a central line substantially coincident with a central line of the slit between the branch electrodes to which the tooth trough corresponds.

Each of the tooth troughs has a width that is substantially equal to a width of the slit between the branch electrodes to which tooth trough corresponds.

Further included is a cross-shaped keel electrode, the keel electrode having four end points respectively connected to middle points of four peripheral edges of the peripheral frame electrode, the branch electrodes each having two ends respectively connected to the keel electrode and the peripheral frame electrode.

The first branch electrodes incline with respect to a horizontal direction by a degrees, the second branch electrodes inclining with respect to the horizontal direction by a+90 degrees, the third branch electrodes inclining with respect to the horizontal direction by −a degrees, the fourth branch electrodes inclining with respect to the horizontal direction by −(a+90) degrees, wherein a is greater than 0 and smaller than 90;

the plurality of first branch electrodes and the plurality of second branch electrodes being symmetric with respect to a vertical central line of the peripheral frame electrode, the plurality of second branch electrodes and the plurality of third branch electrodes being symmetric with respect to a horizontal central line of the peripheral frame electrode, the third branch electrodes and the fourth branch electrodes being symmetric with respect to the vertical central line of the peripheral frame electrode.

The pixel electrode is formed of a material comprising a metal or a metal oxide.

The present invention also provides a pixel electrode, which comprises: a rectangular peripheral frame electrode and a plurality of branch electrodes arranged in an interior space of the peripheral frame electrode and connected to the peripheral frame electrode;

the peripheral frame electrode comprising four electrode zones, which are respectively first, second, third, and fourth electrode zones, arranged in a two-by-two matrix in the interior thereof;

the plurality of branch electrodes comprising: a plurality of first branch electrodes arranged in the first electrode zone and substantially parallel to and spaced from each other, a plurality of second branch electrodes arranged in the second electrode zone and substantially parallel to and spaced from each other, a plurality of third branch electrodes arranged in the third electrode zone and substantially parallel to and spaced from each other, and a plurality of fourth branch electrodes arranged in the fourth electrode zone and substantially parallel to and spaced from each other;

the peripheral frame electrode having at least a pair of opposite peripheral edges each having an outer side comprising a sawtooth-like configuration, which comprises a plurality of tooth troughs spaced from each other, the tooth troughs each having two opposite side walls, the two side walls of the tooth trough being substantially parallel to a lengthwise direction of the branch electrodes in one of the electrode zones corresponding to the tooth trough, the tooth troughs having a depth that is smaller than a width of a peripheral edge of the peripheral frame electrode on which the tooth troughs are provided;

further comprising a cross-shaped keel electrode, the keel electrode having four end points respectively connected to middle points of four peripheral edges of the peripheral frame electrode, the branch electrodes each having two ends respectively connected to the keel electrode and the peripheral frame electrode;

wherein the pixel electrode is formed of a material comprising a metal or a metal oxide.

The efficacy of the present invention is that the present invention provides a pixel electrode. The pixel electrode comprises a peripheral frame electrode that is in an enclosed form and at least one pair of peripheral edges of the peripheral frame electrode are provided, on outer sides thereof, with a sawtooth-like configuration. The sawtooth-like configuration comprises tooth troughs having an extension direction that is substantially parallel to and consistent with an extension direction of branch electrodes of the pixel electrode corresponding thereto so that liquid crystal in an area corresponding to the peripheral frame electrode may incline in the direction of the branch electrodes in the same way as liquid crystal in an inside area of the peripheral frame electrode inclines in such a direction to prevent the occurrence of dark patterns in the area corresponding to the peripheral frame electrode. Application of the pixel electrode to a high vertical alignment (HVA) mode liquid crystal display panel would effectively improve transmission rate and brightness of the liquid crystal display panel so as to improve the display performance.

BRIEF DESCRIPTION OF THE DRAWINGS

For better understanding of the features and technical contents of the present invention, reference will be made to the following detailed description of the present invention, in combination with the attached drawings. However, the drawings are provided only for reference and illustration and are not intended to limit the present invention.

In the drawings.

DETAILED DESCRIPTION OF THE PREFERRED EMBODIMENTS

To further expound the technical solution adopted in the present invention and the advantages thereof, a detailed description will be given with reference to the preferred embodiments of the present invention and the drawings thereof.

Figure 1:
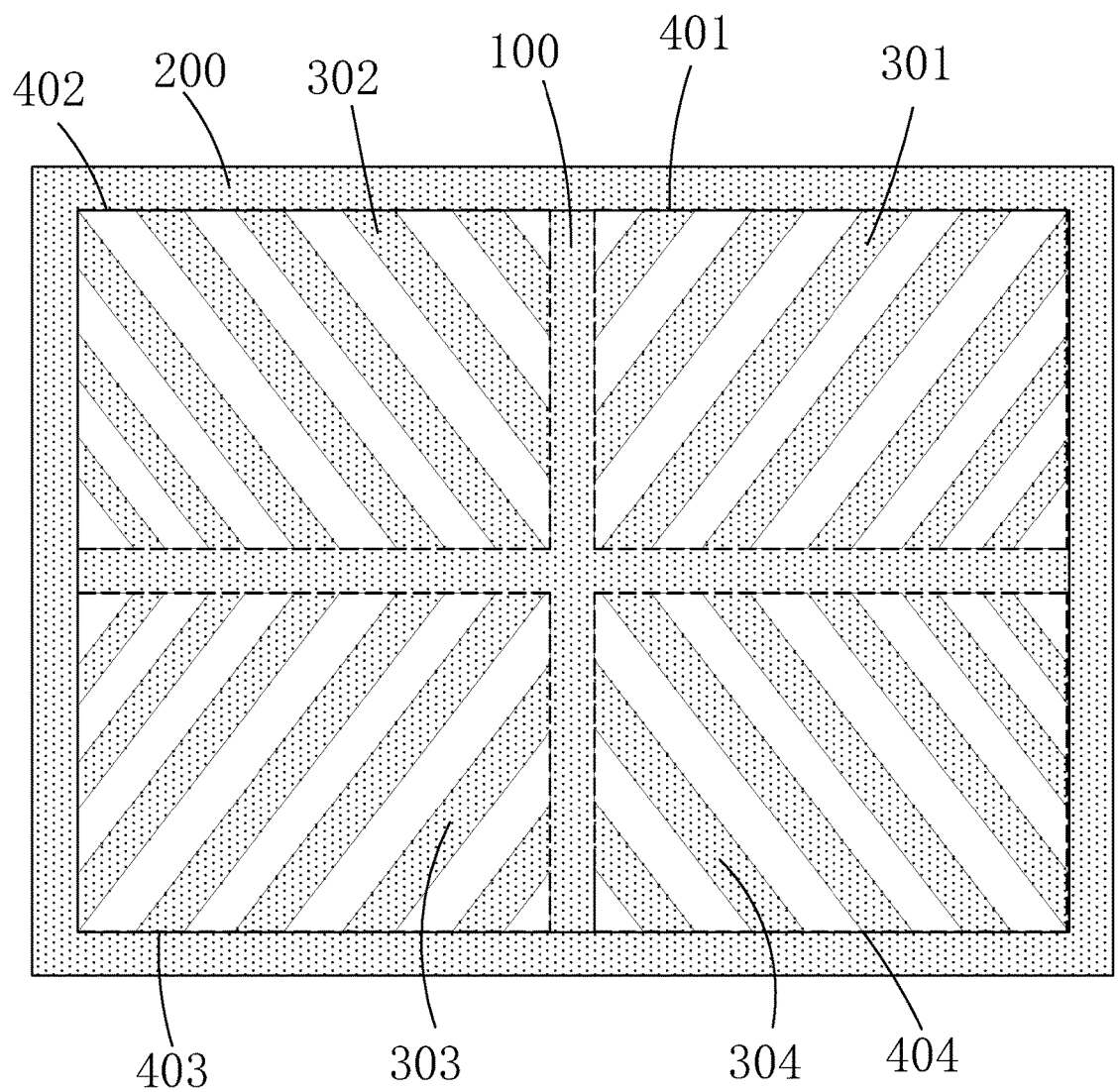
FIG. 1 is a schematic view illustrating the structure of a conventional high vertical alignment (HVA) mode liquid crystal display panel.
Figure 2:
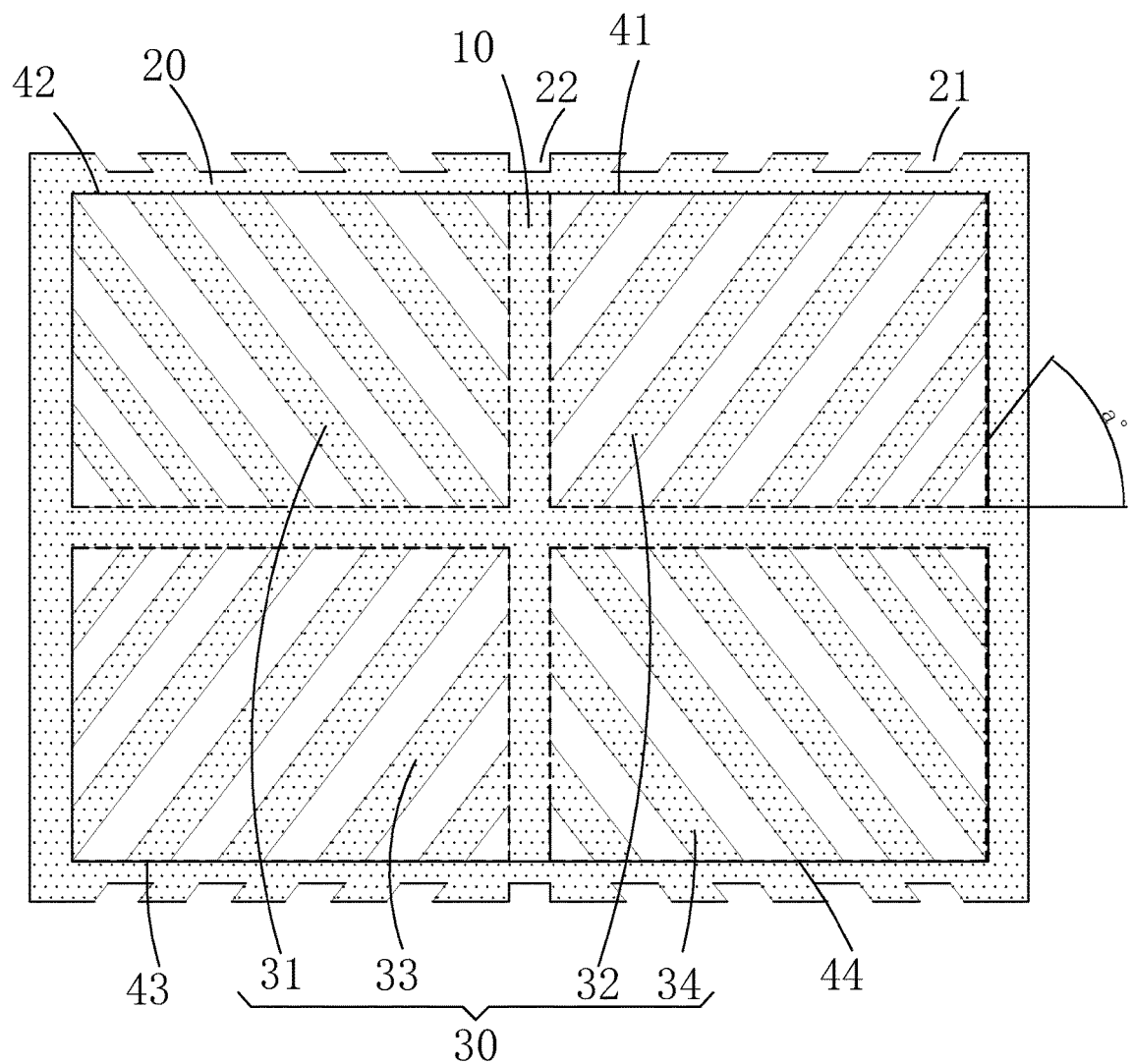
FIG. 2 is a schematic view illustrating the structure of a first embodiment of a pixel electrode according to the present invention.
Figure 3:
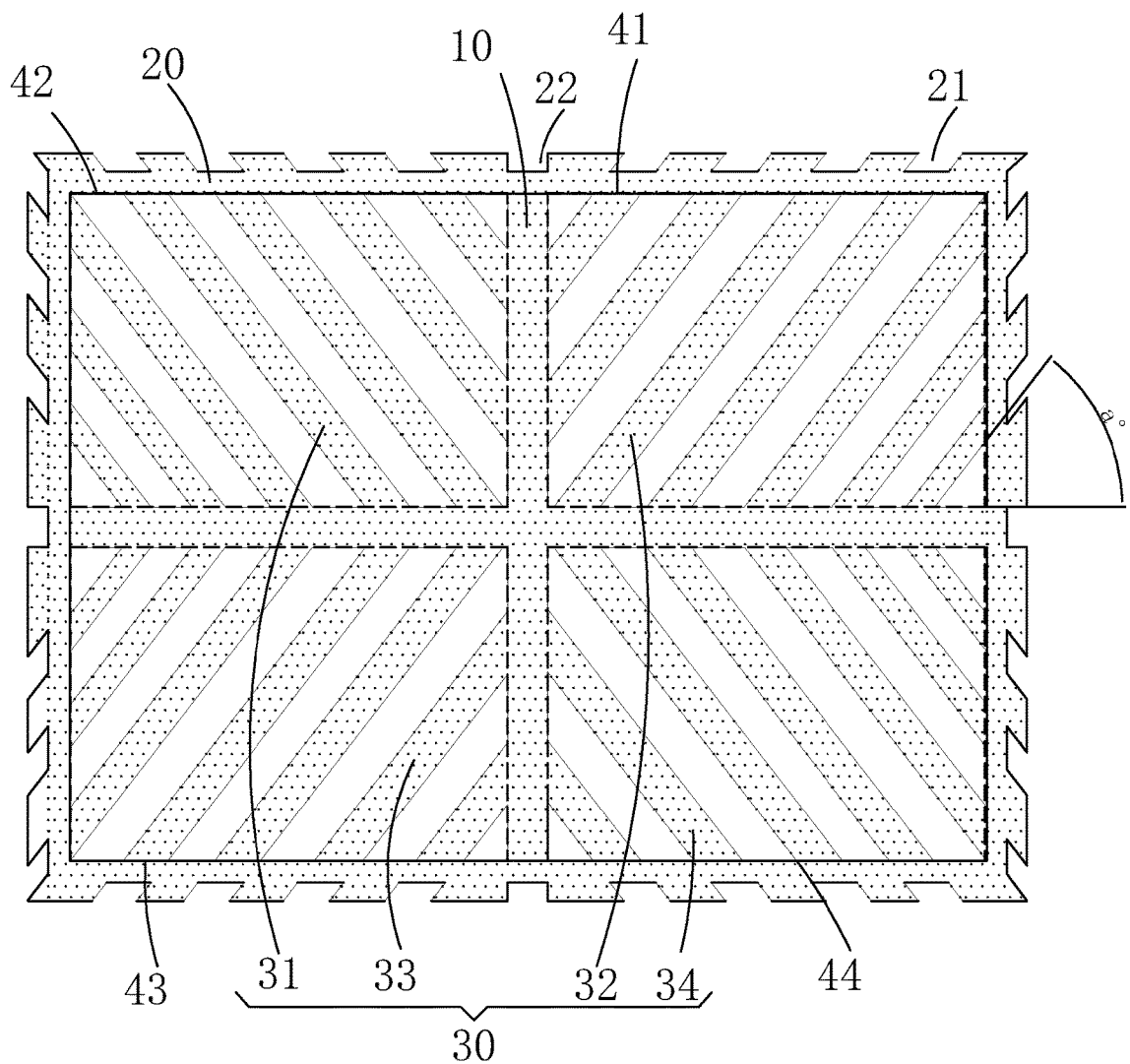
FIG. 3 is a schematic view illustrating the structure of a second embodiment of the pixel electrode according to the present invention.

Referring to FIGS. 2-3, the present invention provides a pixel electrode, which comprises: a rectangular peripheral frame electrode 20 and a plurality of branch electrodes 30 arranged in an interior space of the peripheral frame electrode 20 and connected to the peripheral frame 20.

The peripheral frame electrode 20 comprises four electrode zones, which are respectively first, second, third, and fourth electrode zones 41, 42, 43, 44, arranged in a two-by-two matrix in the interior thereof.

The plurality of branch electrodes 30 comprise: a plurality of first branch electrodes 31 in the form of strips that are arranged in the first electrode zone 41 and substantially parallel to and spaced from each other and inclined with respect to a horizontal direction by an angle of a degrees, a plurality of second branch electrodes 32 in the form of strips that are arranged in the second electrode zone 42 and substantially parallel to and spaced from each other and inclined with respect to the horizontal direction by an angle of a+90 degrees, a plurality of third branch electrodes 33 in the form of strips that are arranged in the third electrode zone 43 and substantially parallel to and spaced from each other and inclined with respect to the horizontal direction by an angle of –a degrees, and a plurality of fourth branch electrodes 34 in the form of strips that are arranged in the fourth electrode zone 44 and substantially parallel to and spaced from each other and inclined with respect to the horizontal direction by an angle of –(a+90) degrees, where a is greater than 0 and smaller than 90, and preferably a is equal to 45.

Referring to FIG. 2, in a first embodiment of the present invention, a pair of opposite peripheral edges of the peripheral frame electrode 20 that are relatively long are each provided on an outer side thereof with a sawtooth-like configuration, which comprises a plurality of tooth troughs 21 arranged to be spaced from each other. The tooth troughs 21 each have two opposite side walls and the two side walls of the tooth trough 21 are substantially parallel to a lengthwise direction of the branch electrodes 30 that are arranged in one of the electrode zones corresponding to the tooth trough 21. In other words, an extension direction of the tooth trough 21 and that of the branch electrodes 30 to which the tooth trough 21 corresponds are substantially parallel to and consistent with each other. The tooth trough 21 has a depth that is smaller than a width of a peripheral edge of the peripheral frame electrode 20 on which the tooth trough is provided. In other words, the tooth trough 21 has a bottom that is distant from an inner side of the peripheral edge of the peripheral frame electrode 20 on which the tooth trough is provided by a predetermined safe distance in order to prevent damage to an enclosure structure of the peripheral frame electrode 20.

Further, in the first embodiment of the present invention, the tooth troughs 21 are arranged such that they correspond, in a one by one manner, to the branch electrodes 30 connected to the peripheral edge on which the tooth troughs are provided such that a central line of each of the tooth troughs 21 is coincident with a central line of the corresponding branch electrode 30. In other words, the tooth troughs 21 are respectively arranged on the extension directions of the respective branch electrodes 30. Specifically, the tooth troughs 21 have a width that is smaller than a sum of a width of the branch electrode 30 corresponding thereto and widths of slits on the two opposite sides of the branch electrode and, preferably, the width of the tooth trough 21 is substantially equal to the width of the branch electrode 30 corresponding thereto.

It is appreciated that the tooth troughs 21 are not limited to an arrangement that the tooth troughs correspond, in a one by one manner, to the branch electrodes 30 that are connected to the peripheral edge on which the tooth troughs are provided and may be alternatively arranged so as to correspond, in a one by one manner, to the slits between the branch electrodes 30 that are connected to the peripheral edge on which the tooth troughs are provided, with the central line of each of the tooth troughs 21 substantially coincident with a central line of the slit corresponding thereto; and under this condition, the width of the tooth trough 21 is smaller than a sum of the width of the slit corresponding thereto and the widths of the branch electrodes 30 on the two opposite sides of the slit, and preferably the width of each of the tooth troughs 21 is substantially equal to the width of the corresponding slit. It is apparent that the tooth troughs 21 do not need to correspond to the slits, nor do they correspond to the branch electrodes 30 and the locations where they are arranged and the number that they are provided can be set according to practical requirements, provided the extension direction of the tooth troughs 21 is substantially parallel to and consistent with the extension direction of the branch electrodes 30 within the electrode zone to which the tooth troughs 21 correspond and the depth of the tooth troughs 21 is smaller than the width of the peripheral edge of the peripheral frame electrode 20 such that liquid crystal at a location corresponding to the peripheral frame electrode 20 is allowed to incline in the direction of the branch electrodes 30 in the same way as liquid crystal located in an inside area of the peripheral frame electrode 20 inclines in such a direction to eliminate the occurrence of dark patterns. Further, in the first embodiment of the present invention, the pair of peripheral edges of the peripheral frame electrode 20 that are relatively long are provided on the outer sides thereof with the sawtooth-like configuration, and similarly, the present invention may be structured such that a pair of peripheral edges of the peripheral frame electrode 20 that are relatively short are provided, on outer sides thereof, with a sawtooth-like configuration, similarly achieving the present invention.

Referring to FIG. 3, in a second embodiment of the present invention, as compared to the first embodiment, two pairs of peripheral edges of the peripheral frame electrode 20 are both provided with a sawtooth-like configuration on an outer side of each of the edges. This helps further reduce the dark patterns in the areas corresponding to the peripheral frame electrode 20 and improves the display performance thereof. The remaining is similar to those of the first embodiment and repeated descriptions will be omitted herein.

Further, in the first and second embodiments of the present invention, the pixel electrode may further comprise a cross-shaped keel electrode 10. The keel electrode 10 has four end points that are respectively connected to middle points of four peripheral edges of the peripheral frame electrode 20. The branch electrodes 30 each have two opposite ends respectively connected to the keel electrode 10 and the peripheral frame electrode 20. Under this condition, a keel-associated tooth trough 22 is provided on an outer side of each of the connections between the peripheral frame electrode 20 and the keel electrode 10 and the keel-associated tooth troughs 22 are formed in extension directions of the keel electrode 10. It is apparent that a technical solution that involves no keel electrode may be adopted and this is not provided for imposing constraint to the present invention.

Preferably, the plurality of first branch electrodes 31 and the plurality of second branch electrodes 32 are symmetric with respect to a vertical central line of the peripheral frame electrode 20; the plurality of second branch electrodes 32 and the plurality of third branch electrodes 33 are symmetric with respect to a horizontal central line of the peripheral frame electrode 20; and the third branch electrodes 33 and the fourth branch electrodes 34 are symmetric with respect to the vertical central line of the peripheral frame electrode 20. It is apparent that a non-symmetric arrangement of the branch electrodes may be alternatively adopted and this is not provided for imposing constraint to the present invention.

Preferably, the pixel electrode is made of a material comprising a metal or a metal oxide.

In summary, the present invention provides a pixel electrode. The pixel electrode comprises a peripheral frame electrode that is in an enclosed form and at least one pair of peripheral edges of the peripheral frame electrode are provided, on outer sides thereof, with a sawtooth-like configuration. The sawtooth-like configuration comprises tooth troughs having an extension direction that is substantially parallel to and consistent with an extension direction of branch electrodes of the pixel electrode corresponding thereto so that liquid crystal in an area corresponding to the peripheral frame electrode may incline in the direction of the branch electrodes in the same way as liquid crystal in an inside area of the peripheral frame electrode inclines in such a direction to prevent the occurrence of dark patterns in the area corresponding to the peripheral frame electrode. Application of the pixel electrode to a high vertical alignment (HVA) mode liquid crystal display panel would effectively improve transmission rate and brightness of the liquid crystal display panel so as to improve the display performance.

Based on the description given above, those having ordinary skills in the art may easily contemplate various changes and modifications of the technical solution and the technical ideas of the present invention. All these changes and modifications are considered belonging to the protection scope of the present invention as defined in the appended claims.

What is claimed is:

1. A pixel electrode, comprising: a rectangular peripheral frame electrode and a plurality of branch electrodes arranged in an interior space of the peripheral frame electrode and connected to the peripheral frame electrode;

the peripheral frame electrode comprising an outer enclosure border and an opposite, inner enclosure border, wherein the inner enclosure border circumscribes an internal area of the peripheral frame electrode that is divided into four electrode zones, which are respectively first, second, third, and fourth electrode zones, arranged in a two-by-two matrix in the interior thereof;

the plurality of branch electrodes comprising: a plurality of first branch electrodes arranged in the first electrode zone and substantially parallel to and spaced from each other, a plurality of second branch electrodes arranged in the second electrode zone and substantially parallel to and spaced from each other, a plurality of third branch electrodes arranged in the third electrode zone and substantially parallel to and spaced from each other, and a plurality of fourth branch electrodes arranged in the fourth electrode zone and substantially parallel to and spaced from each other;

the peripheral frame electrode comprising at least a pair of opposite peripheral edges each having an outer side forming partly the outer enclosure border, the outer sides of the outer enclosure border comprising a saw-tooth-like configuration, which comprises a plurality of tooth troughs spaced from each other, the tooth troughs each having two opposite side walls, the two side walls of the tooth trough being substantially parallel to a lengthwise direction of the branch electrodes in one of the electrode zones corresponding to the tooth trough, the tooth troughs having a depth that is smaller than a width of a peripheral edge of the peripheral frame electrode on which the tooth troughs are provided;

wherein the tooth troughs are arranged along the outer enclosure border of the peripheral frame electrode and the plurality of branch electrodes are arranged in the internal area circumscribed by the inner enclosure border of the peripheral frame electrode so that the tooth troughs and the branch electrodes are arranged on opposite sides of each of the peripheral edges of the peripheral frame electrode.

2. The pixel electrode as claimed in claim 1, wherein one pair of opposite peripheral edges of the peripheral frame electrode is provided, on outer sides thereof, with the sawtooth-like configuration.

3. The pixel electrode as claimed in claim 1, wherein two pairs of opposite peripheral edges of the peripheral frame electrode are provided, on outer sides thereof, with the sawtooth-like configuration.

4. The pixel electrode as claimed in claim 1, wherein the tooth troughs correspond, in a one by one manner, to the branch electrodes that are connected to the peripheral edge on which the tooth troughs are provided and each of the tooth troughs has a central line substantially coincident with a central line of the branch electrode to which the tooth trough corresponds.

5. The pixel electrode as claimed in claim 4, wherein each of the tooth troughs has a width that is substantially equal to a width of the branch electrode to which the tooth trough corresponds.

6. The pixel electrode as claimed in claim 1, wherein the tooth troughs respectively correspond to slits formed between the branch electrodes connected to the peripheral edge on which the tooth troughs are provided and each of the tooth troughs has a central line substantially coincident with a central line of the slit between the branch electrodes to which the tooth trough corresponds.

7. The pixel electrode as claimed in claim 6, wherein each of the tooth troughs has a width that is substantially equal to a width of the slit between the branch electrodes to which tooth trough corresponds.

8. The pixel electrode as claimed in claim 1 further comprising a cross-shaped keel electrode, the keel electrode having four end points respectively connected to middle points of four peripheral edges of the peripheral frame electrode, the branch electrodes each having two ends respectively connected to the keel electrode and the peripheral frame electrode.

9. The pixel electrode as claimed in claim 1, wherein the first branch electrodes incline with respect to a horizontal direction by a degrees, the second branch electrodes inclining with respect to the horizontal direction by a+90 degrees, the third branch electrodes inclining with respect to the horizontal direction by −a degrees, the fourth branch electrodes inclining with respect to the horizontal direction by −(a+90) degrees, wherein a is greater than 0 and smaller than 90;

the plurality of first branch electrodes and the plurality of second branch electrodes being symmetric with respect to a vertical central line of the peripheral frame electrode, the plurality of second branch electrodes and the plurality of third branch electrodes being symmetric with respect to a horizontal central line of the peripheral frame electrode, the third branch electrodes and the fourth branch electrodes being symmetric with respect to the vertical central line of the peripheral frame electrode.

10. The pixel electrode as claimed in claim 1, wherein the pixel electrode is formed of a material comprising a metal or a metal oxide.

11. A pixel electrode, comprising: a rectangular peripheral frame electrode and a plurality of branch electrodes arranged in an interior space of the peripheral frame electrode and connected to the peripheral frame electrode;

the peripheral frame electrode comprising an outer enclosure border and an opposite, inner enclosure border, wherein the inner enclosure border circumscribes an internal area of the peripheral frame electrode that is divided into four electrode zones, which are respectively first, second, third, and fourth electrode zones, arranged in a two-by-two matrix in the interior thereof;

the plurality of branch electrodes comprising: a plurality of first branch electrodes arranged in the first electrode zone and substantially parallel to and spaced from each other, a plurality of second branch electrodes arranged in the second electrode zone and substantially parallel to and spaced from each other, a plurality of third branch electrodes arranged in the third electrode zone and substantially parallel to and spaced from each other, and a plurality of fourth branch electrodes arranged in the fourth electrode zone and substantially parallel to and spaced from each other;

the peripheral frame electrode comprising at least a pair of opposite peripheral edges each having an outer side forming partly the outer enclosure border, the outer sides of the outer enclosure border comprising a sawtooth-like configuration, which comprises a plurality of tooth troughs spaced from each other, the tooth troughs each having two opposite side walls, the two side walls of the tooth trough being substantially parallel to a lengthwise direction of the branch electrodes in one of the electrode zones corresponding to the tooth trough, the tooth troughs having a depth that is smaller than a width of a peripheral edge of the peripheral frame electrode on which the tooth troughs are provided;

wherein the tooth troughs are arranged along the outer enclosure border of the peripheral frame electrode and the plurality of branch electrodes are arranged in the internal area circumscribed by the inner enclosure border of the peripheral frame electrode so that the tooth troughs and the branch electrodes are arranged on opposite sides of each of the peripheral edges of the peripheral frame electrode;

further comprising a cross-shaped keel electrode, the keel electrode having four end points respectively connected to middle points of four peripheral edges of the peripheral frame electrode, the branch electrodes each having two ends respectively connected to the keel electrode and the peripheral frame electrode;

wherein the pixel electrode is formed of a material comprising a metal or a metal oxide.

12. The pixel electrode as claimed in claim 11, wherein one pair of opposite peripheral edges of the peripheral frame electrode is provided, on outer sides thereof, with the sawtooth-like configuration.

13. The pixel electrode as claimed in claim 11, wherein two pairs of opposite peripheral edges of the peripheral frame electrode are provided, on outer sides thereof, with the sawtooth-like configuration.

14. The pixel electrode as claimed in claim 11, wherein the tooth troughs correspond, in a one by one manner, to the branch electrodes that are connected to the peripheral edge on which the tooth troughs are provided and each of the tooth troughs has a central line substantially coincident with a central line of the branch electrode to which the tooth trough corresponds.

15. The pixel electrode as claimed in claim 14, wherein each of the tooth troughs has a width that is substantially equal to a width of the branch electrode to which the tooth trough corresponds.

16. The pixel electrode as claimed in claim 11, wherein the tooth troughs respectively correspond to slits formed between the branch electrodes connected to the peripheral edge on which the tooth troughs are provided and each of the tooth troughs has a central line substantially coincident with a central line of the slit between the branch electrodes to which the tooth trough corresponds.

17. The pixel electrode as claimed in claim 16, wherein each of the tooth troughs has a width that is substantially equal to a width of the slit between the branch electrodes to which tooth trough corresponds.

18. The pixel electrode as claimed in claim 11, wherein the first branch electrodes incline with respect to a horizontal direction by a degrees, the second branch electrodes inclining with respect to the horizontal direction by a+90 degrees, the third branch electrodes inclining with respect to the horizontal direction by −a degrees, the fourth branch electrodes inclining with respect to the horizontal direction by −(a+90) degrees, wherein a is greater than 0 and smaller than 90;

the plurality of first branch electrodes and the plurality of second branch electrodes being symmetric with respect to a vertical central line of the peripheral frame electrode, the plurality of second branch electrodes and the plurality of third branch electrodes being symmetric with respect to a horizontal central line of the peripheral frame electrode, the third branch electrodes and the fourth branch electrodes being symmetric with respect to the vertical central line of the peripheral frame electrode.

* * * * *